(12) United States Patent
Beitler et al.

(10) Patent No.: US 10,216,673 B2
(45) Date of Patent: Feb. 26, 2019

(54) USB DEVICE FIRMWARE SANITIZATION (71) Applicant: International Business Machines Corporation, Armonk, NY (US)

(72) Inventors: Anton Beitler, Zurich (CH); Jiyong Jang, White Plains, NY (US); Dhilung Hang Kirat, White Plains, NY (US); Anil Kurmus, Rueschlikon (CH); Matthias Neugschwandtner, Zurich (CH); Marc Philippe Stoecklin, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 15/406,995

(22) Filed: Jan. 16, 2017

(65) Prior Publication Data
US 2018/0203819 A1 Jul. 19, 2018

(51) Int. Cl.
G06F 13/20 (2006.01)
G06F 13/38 (2006.01)
G06F 13/42 (2006.01)
G06F 9/4401 (2018.01)

(52) U.S. Cl.
CPC .......... G06F 13/385 (2013.01); G06F 9/4411 (2013.01); G06F 13/4282 (2013.01)

(58) Field of Classification Search
CPC ...................................................... G06F 13/20
See application file for complete search history.

(56) References Cited

U.S. PATENT DOCUMENTS

| | | | | |
|---|---|---|---|---|
| 7,886,353 B2* | 2/2011 | Avraham | ............... | G06F 13/102 713/189 |
| 7,912,987 B2* | 3/2011 | Zhong | ..................... | H04L 67/38 709/203 |
| 7,974,577 B2* | 7/2011 | Stephens, Jr. | ......... | G06F 13/387 455/41.2 |
| 8,209,739 B2* | 6/2012 | Terpening | ........... | G06F 21/6236 710/107 |
| 8,560,864 B2* | 10/2013 | Chang | ................... | G06F 21/567 713/193 |
| 8,646,082 B2 | 2/2014 | Lomont et al. | | |
| 8,694,695 B2* | 4/2014 | Lee | ......................... | H04L 67/42 710/13 |
| 8,862,803 B2* | 10/2014 | Powers | ................. | G06F 13/385 710/306 |

(Continued)

OTHER PUBLICATIONS

CIRCLean—USB key sanitizer (2008-2016), (downloaded on Oct. 24, 2016 from https://www.circl.lu/projects/CIRCLean/), (11 pages).

(Continued)

Primary Examiner — Cheng Yuan Tseng
(74) Attorney, Agent, or Firm — Harrington & Smith (57) ABSTRACT

Communications are intercepted between a universal serial bus (USB) device and a host, at least by implementing first device firmware of the USB device. The USB device contains its own second device firmware. Using at least the implemented first device firmware, intercepted communications from the USB device toward the host are sanitized. The sanitizing is performed so that no communication from the USB device is directly forwarded to the host and instead only sanitized communications are forwarded to the host. Methods, apparatus, and computer program products are disclosed.

16 Claims, 7 Drawing Sheets

(56) References Cited

U.S. PATENT DOCUMENTS

| | | | |
|---|---|---|---|
| 9,237,125 B1* | 1/2016 | Bardgett | H04L 63/02 |
| 9,392,021 B1* | 7/2016 | Labana | H04L 63/08 |
| 9,430,621 B2* | 8/2016 | Larky | G06F 8/654 |
| 9,973,471 B2* | 5/2018 | Chen | H04L 63/02 |
| 9,990,325 B2* | 6/2018 | Hetzler | G06F 13/4068 |
| 2011/0030030 A1 | 2/2011 | Terpening et al. | |
| 2012/0240234 A1 | 9/2012 | Lomont et al. | |
| 2012/0311207 A1 | 12/2012 | Powers et al. | |
| 2013/0014221 A1 | 1/2013 | Moore et al. | |
| 2014/0019651 A1 | 1/2014 | Ben-Harosh | |

OTHER PUBLICATIONS

Dan Goodin, "This thumbdrive hacks computers. 'BadUSB' exploit makes devices turn 'evil'", Ars Technica (Jul. 31, 2014) (downloaded on Oct. 12, 2016 from http://arstechnica.com/security/2014/07/this-thumbdrive-hacks-computers-badusb-exploit-makes-devices-turn-evil/), (5 pages).

Ironkey Secure USB Devices (2016) (downloaded on Oct. 12, 2016 from http://www.ironkey.com/en-US/solutions/protect-against-badusb.html), (3 pages).

CIRCLean: USB key sanitizer (2008-2016) (downloaded on Oct. 12, 2016 from https://www.circl.lu/projects/CIRCLean/),(11 pages).

SafeSquid Secure Web Gateway (2016) (downloaded on Oct. 12, 2016 from https://www.safesquid.com/), (2 pages).

SafeSquid Secure Web Gateway, Overview (2016) (downloaded on Oct. 12, 2016 from https://www.safesquid.com/content-filtering/overview), (5 pages).

NIST, Vulnerability Summary for CVE-2016-2384, National Vulnerability Database (2016) (downloaded on Oct. 12, 2016 from https://web.nvd.nist.gov/view/vuln/detail?vulnId=CVE-2016-2384), (3 pages).

"SyncStop/USB condom, charge your mobile phone safely" (2016), (downloaded on Oct. 24, 2016 from http://syncstop.com), (7 pages).

Dan Goodin, "This thumbdrive hacks computers. 'BadUSB' exploit makes devices turn 'evil'", Ars Technica (Jul. 31, 2014) (downloaded on Oct. 12, 2016 from http://arstechnica.com/security/2014/07/this-thumbdrive-hacks-computers-badusb-exploit-makes-devices-turn-evil/), (26 pages).

* cited by examiner

USB DEVICE FIRMWARE SANITIZATION

BACKGROUND

This invention relates generally to serial buses and, more specifically, relates to USB devices and their firmware.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations and acronyms used in this document and/or the drawings are defined below, prior to the claims.

Universal serial bus (USB) connections and devices have become ubiquitous, and for good reason: these allow users to connect many different devices through a common connection and interface. For instance, a user can connect peripherals such as pointing devices (e.g., trackballs or mice), audio cards or digital-to-analog converters, keyboards, memories such as memory sticks or hard drives, cameras, cellular phones, and the like to hosts such as computers, all with a single physical interface.

The pervasive availability of USB connectivity throughout computer and mobile peripherals, however, makes USB an increasingly appealing attack vector. Misbehaving USB devices are a threat to the security of the hosts to which they are attached. This is particularly true, given that the device drivers on the host typically run at a high privilege level, meaning they have access to computer resources they would not otherwise have. For instance, applications typically have lower privileges than do device drivers such as those used for USB devices. Thus, such attacks have the potential to fully compromise the host.

By exploiting weak spots in device driver implementations on the host side, a USB device can gain control over the host. As an example, a vulnerability referred to as CVE-2016-2384 is described as allowing "physically proximate attackers to cause a denial of service (panic) or possibly have unspecified other impact via vectors involving an invalid USB descriptor." See the National Institute of Standards and Technology, National Vulnerability Database, vulnerability identification CVE-2016-2384.

USE devices that misbehave can be created in different ways: on one hand, misbehaving USE devices can already be created with malicious intent; while on the other hand, it has been shown that benign USB devices can be modified to misbehave. Thus, even "good" USB devices can be modified to be "bad". One such example is a USE "hack" referred to as "BadUSB", which is described as a hack that "reprograms embedded firmware to give USB devices new, covert capabilities." See Dan Goodin, "This thumbdrive hacks computers. 'BadUSB' exploit makes devices turn 'evil'", Ars Technica (Jul. 31, 2014).

Consequently, while USB devices are undoubtedly beneficial, they have also become more dangerous. It is currently difficult to prevent or ameliorate attacks by misbehaving USB devices, regardless of how they are created.

BRIEF SUMMARY

This section is intended to include examples and is not intended to be limiting.

Communications are intercepted between a universal serial bus (USB) device and a host, at least by implementing first device firmware of the USB device. The USB device contains its own second device firmware. Using at least the implemented first device firmware, intercepted communications from the USB device toward the host are sanitized. The sanitizing is performed so that no communication from the USB device is directly forwarded to the host and instead only sanitized communications are forwarded to the host. Methods, apparatus, and computer program products are disclosed.

BRIEF DESCRIPTION OF THE DRAWINGS

In the attached Drawing Figures:

FIG. 1B illustrates possible internal configuration of the elements of the system in FIG. 1A, FIG. 1C expands on an example from FIG. 1B where the sanitizer is implemented in the host, FIG. 1D illustrates a sanitizer implemented in a separate USB device, and FIG. 1E illustrates another example of the system of FIG. 1D;

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for USB device firmware sanitization. USB device firmware sanitization, as described here, protects a host against misbehaving USB devices by in an exemplary embodiment replacing the malicious device's firmware with its own, independent and clean implementation. This process is referred to as "firmware sanitization", e.g., so as not to be confused with media sanitization.

The exemplary embodiments act as a sanitizing proxy sitting in-between the malicious device and the victim host. The proxy (referred to as a sanitizer) intercepts the communication by acting as a host towards the malicious device and as a device towards the victim host. The sanitizer processes the communication from the malicious device in a robust way to access its functionality at the application layer. The sanitizer then uses the application-layer functionality to interface its own implementation of the device's firmware, which in turn provides this firmware to the host. This way, the sanitizer sanitizes the malicious device's firmware and communication with the host.

The exemplary embodiments do not require any modification of the host and are thus compatible with systems that do not allow modification of the host's software stack, such as legacy systems, embedded systems, or industrial control systems.

Figure 1:
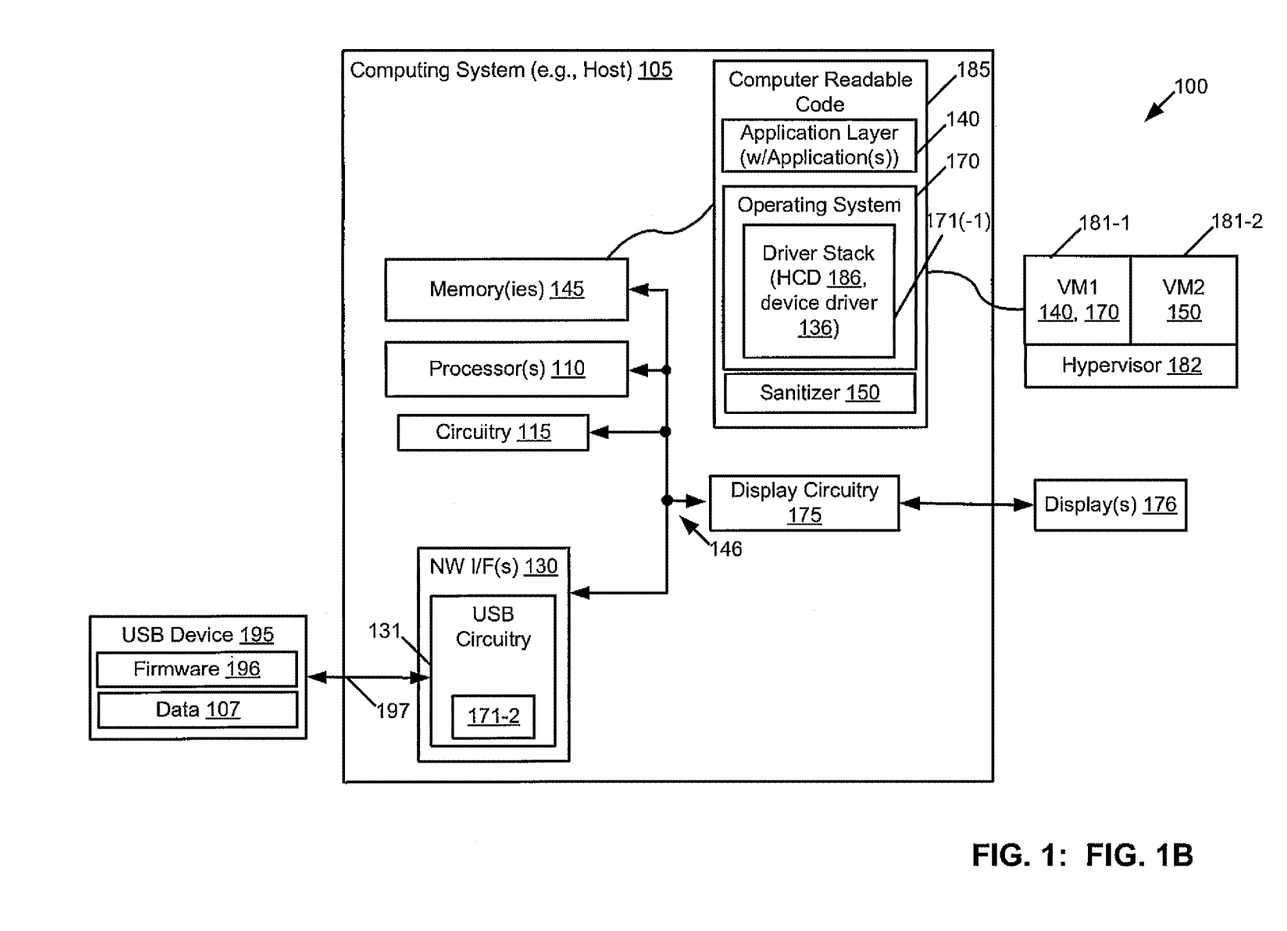
FIG. 1, which includes FIGS. 1A, 1B, 1C, 1D, and 1E, contains block diagrams of several possible and non-limiting exemplary systems in which the exemplary embodiments may be practiced, where
Figure 1A:
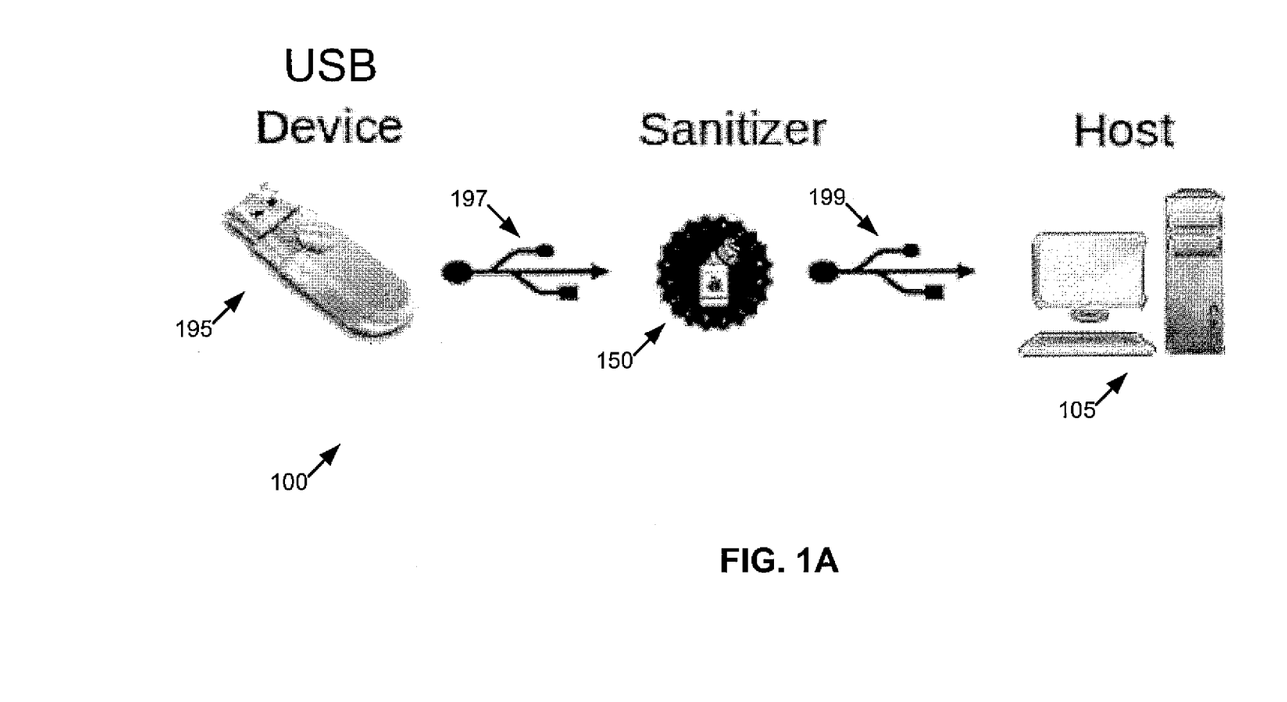
FIG. 1A presents a logical sanitizer setup in relation to a USB device and a host.

Turning to FIG. 1, which includes FIGS. 1A, 1B, 1C, 1D, and 1E, this figure is a block diagram of several possible and non-limiting exemplary systems in which the exemplary embodiments may be practiced. FIG. 1A presents a logical sanitizer setup in relation to a USB device and a host, and FIG. 1B illustrates possible internal configuration of the elements of the system in FIG. 1A. FIG. 1C expands on an example from FIG. 1B where the sanitizer is implemented in the host, FIG. 1D illustrates a sanitizer implemented in a separate USB device, and FIG. 1E illustrates another example of the system of FIG. 1D.

In the logical sanitizer setup of FIG. 1A, a sanitizer 150 in accordance with the exemplary embodiments sits between the USB device 195 and the host 105. The USB device 195 connects to a USB bus 197, and the sanitizer 150 intercepts communications via the USB bus 197 between the USB device 195 and the host 105, using techniques described below. The sanitizer 150 connects via USB bus 199 to the host 105 and intercepts communications via the USB bus 199 between the USB device 195 and the host 105, using techniques described below. This is a logical way of looking at this system, because the USB buses 197 and 199 and sanitizer 150 may in certain embodiments be implemented inside of the host 105 (as illustrated by FIG. 1B). The sanitizer 150 may also be implemented using other configurations, such as a USB firewall, where the logical configuration is the configuration illustrated by FIG. 1A and the physical configuration is illustrated in FIG. 1C.

Regarding FIG. 1B, this figure illustrates one possible internal configuration of the host 105, which is a computing system. Reference 105 will be referred to as both host 105 and computing system 105. The computing system 105 may be a personal computer, server, laptop computer, wireless device such as a smartphone or tablet, an embedded system, or any other device that uses a USB bus. In this example, the computing system 105 comprises one or more memories 145, one or more processors 110, circuitry 115, one or more network (NW) interfaces (I/F(s)) 130, display circuitry 175, and a sanitizer 150, all interconnected through one or more buses 146. The buses 146 may be address, data, and/or control buses and may be implemented using many different techniques, such as traces on a board, metallization in a semiconductor, and the like. The one or more memories 145 comprise computer readable code 185 comprising an application layer 140 (e.g., including one or more applications), an operating system (OS) 170, and sanitizer 150-1. The operating system 170 comprises a driver stack 171 (or 171-1, depending on implementation). The driver stack 171 typically has a host controller driver (HCD) 186 and a device driver 136 for the USB device 195. The computing system 105 may also be connected to one or more displays 176, driven by the display circuitry 175. The computing system 105 may include a display 176, such as if the computing system 105 is a smartphone. In other implementations, the display circuitry 175 and display(s) 176 are not used.

The USB device 195 comprises firmware 196 and data 107 and is connected via the USB bus 197 to the USB circuitry 131 (e.g., and through the sanitizer 150 as described below) to the one or more buses 146. The firmware 196 is used by the USB device 195 to perform actions to interface with a USB bus 197 and a host 105. The data 107 may be stored data, such as non-volatile data on a memory stick or hard drive, or such as volatile data generated and briefly stored for sending to the host, like keyboard strokes, mouse actions, and similar events. That is, the data 107 depend on the type for the USB device 195. The data 107 may also include packets that are used to communicate via the USB bus 197 and that package the stored data for communications.

The network interfaces 130 can be wired and/or wireless and communicate with networks such as local area networks or short-range wireless networks. In one sense, a USB is a network and this example illustrates that USB circuitry 131 is part of the NW I/F(s) 130, although other implementations are possible. Such USB circuitry 131 could include, e.g., USB controllers and corresponding USB hubs that are internal to the host 105. As described above, the OS 170 can include a driver stack 171. This driver stack 171 typically includes USB drivers such as a host controller driver (HCD) 186 and a device driver 136. Depending on implementation, the driver stack 171 for USB drivers could be implemented all in the computer readable code 185 as driver stack 171, or could be implemented in part in the computer readable code as driver stack 171-1 and in the USB circuitry 131 as driver stack 171-2.

The operating system 170 is system software that manages computer hardware and software resources and provides common services for computer programs (i.e., applications in the application layer 140). The applications in the application layer 140 are one possible source or sink for data passing to or from the USB device 195.

For embodiments where computer readable code 185 is used, in response to retrieval from the one or more memories 145 of some portion of the computer readable code 185 and subsequent execution of the portion by the one or more processor 110, the computing system 105 is caused to perform the operations as described herein, e.g., for the sanitizer 150. As described in more detail below, there are also options where some or all of the elements in the sanitizer 150 can be implemented in hardware. Such hardware is represented by the circuitry 115, and this circuitry 115 can be implemented as part of the one or more processors 110, as part of an integrated circuit, as part of a programmable gate array, as part of a USB hub, as part of USB circuitry such as a USB controller, and the like. Some combination of computer readable code 185 and circuitry 115 may also be used.

The one or more memories 145 may comprise any suitable memory, such as non-volatile memory comprising one or more of (e.g., programmable) read-only memory, flash memory, various types of magnetic computer storage devices (e.g., hard disk drives), optical discs, and the like. The one or more memories 145 may additionally comprise volatile memory such as random access memory (RAM), e.g., static RAM and/or dynamic RAM.

The one or more processors 110 can be any processors suitable to the technical environment, such as single or multiple core processors, low power processors such as Advanced RISC Machine (ARM) processors, digital signal processors, special-purpose processors, and the like.

In one example, the host 105 could be a computing system such as a personal computer, laptop, or wireless phone or tablet. The previous description of host 105 applies well to this implementation. In another example, the computing system 105 could be a computing system operating multiple virtual machines, e.g., where the computing system 105 uses a hypervisor to create and run such virtual machines. FIG. 1B also illustrates this example, where there is a hypervisor 182 as part of the computer readable code 185 (although hypervisors can also be implemented in whole or part in firmware and/or hardware such as in circuitry 115). The hypervisor 182 creates virtual machines (VMs) 181. In this example, the hypervisor 182 creates a first VM (VM1) 181-1, which implements the application layer 140 and the OS 170, and creates a second VM (VM2) 181-2, which implements the sanitizer 150. The USB device 195 interacts with the sanitizer 150 as described above.

More specifically, as illustrated in FIG. 1C, the hypervisor 182 (as part of the computing system/host 105) creates and configures the sanitizer 150 in the VM 181-2 and creates and configures a host VM 101 in the VM 181-1. The sanitizer 150 comprises an application layer link 160 (e.g., determined by the sanitizer 150 to be able to interact with the application 140 and the USB device 195, as based on the type of the USB device 195), a device driver stack 171, a device firmware stack 165 (e.g., determined by the sanitizer 150 to be able to "replace" the firmware 196 of the USB device 195, as based on the type of the USB device 195), a host controller driver (HCD) 180, a USB device controller (IDC) 155, a USB host port 275-1, and a virtual USB device port 275-2. The host VM 101 comprises an application 140, a device driver stack 136, an HCD 186, and a virtual USB host port 275-3. There is a virtual USB connection (e.g., bus) 199-1 between the virtual USB device port 275-2 and the virtual USB host port 275-3. There is a physical USB connection (e.g., bus) between the USB device port 275-4 on or formed by the USB device 195 and the USB host port 275-1 on or formed by the sanitizer. Additional detail is described in reference to FIG. 2.

In FIG. 1D, a separate USB device 106 is shown. This example illustrates a separate device that implements the sanitizer 150 and that is plugged into the host 105 via the USB bus 199 (e.g., via a USB socket or via a USB cord that is plugged into a USB socket and into the separate USB device 106). The separate USB device 106 may be a USB hub (or a part thereof), a USB protective device (e.g., a device that plugs into a USB socket and accepts USB connections for USB devices 195), or other USB device, and may be powered from the USB bus 199 and/or from an external source. This example uses the reference numerals from FIG. 1B for ease of reference. As in FIG. 1B, the sanitizer 150 may be implemented in part or whole in the computer readable code 185 or possibly in part (or possibly in whole) in the NW I/F(s) 130, or in the circuitry 115, or in a combination of these.

Referring to FIG. 1E, this figure illustrates another example of the system of FIG. 1D. Most of the reference numerals in FIG. 1E are also shown in FIG. 1C, so mainly only the differences are described here. The sanitizer 150 is formed as part of the separate USB device 106, and the virtual USB device ports 275-2 and 275-3 of FIG. 1C are not used. Instead, the sanitizer 150 implements a real USB device port 275-5, and the host 105 also implements a real USE host port 275-6. The virtual USB connection 199-1 of FIG. 1C is a physical USB connection 199-2 in FIG. 1E.

Figure 2:
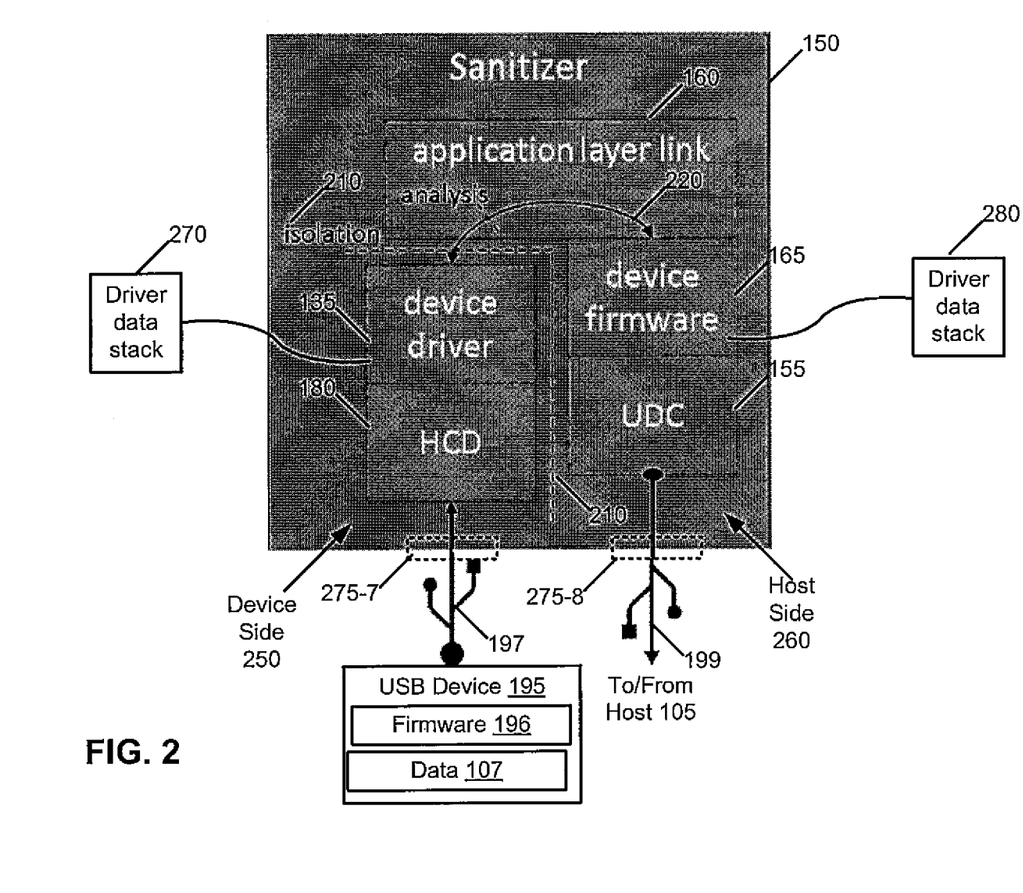
FIG. 2 is a block diagram of a possible sanitizer architecture, in accordance with an exemplary embodiment.

Turning to FIG. 2, this figure is a block diagram of a possible sanitizer architecture, in accordance with an exemplary embodiment. The sanitizer 150 is illustrated as comprising an application layer link 160, device firmware 165, a USB device controller (UDC) 155, a device driver 135, and a human interface device (HCD) 180. The HCD 180 is coupled to the USB device 195 via the bus 197, and the UDC is coupled to the host 105 via the USB bus 199. There is a device side 250, connected to and interacting with the USB device 195, and a host side 260, connected to and interacting with the host 105. Each of the device driver 135 and the device firmware 165 may have a corresponding driver data stack 270, 280, respectively, which is used to hold data from or going to the corresponding side 250, 260, respectively. Each of the device driver 135 and device firmware 165 is selected by the sanitizer based on and corresponding to the USB device 196. For instance, a USB device 195 ostensibly for memory would have a different driver and firmware than would a USB device 195 ostensibly for an input device such as a camera. The device driver 135 is used instead of the device driver 136; the HCD 180 is used instead of the HCD 186; and the device firmware 165 is used instead of the firmware 196.

The functionality of the sanitizer 150 in one exemplary embodiment is a software solution (e.g., implemented as computer readable code 185 and executed by the one or more processors 110) that is not bound to a specific type of hardware. Still, scenarios where the sanitizer is embedded in a dedicated piece of hardware (illustrated at least in party by circuitry 115) are possible. For example, the sanitizer could be a part of a USB hub (as computing system 105), providing sanitization for every connected device.

The sanitizer 150 has two (e.g., virtual or real) USB ports 275: one for the device side (a USB device port 275-7) and one connecting to the host (a USB host port 275-8). It is noted that the USB ports can be hardware ports (e.g., as in FIG. E where a hardware USB socket is used, e.g., as the USB device port 275-5) or virtual ports (e.g., as in FIG. 1C where VMs 181 are used and the virtual USB device port 275-2 is used). The attached device 195 only communicates with the sanitizer 150, and no communication is directly being forwarded to the host 105. Instead, the sanitizer only forwards sanitized communications to the host 105. When attached, interfaces for the USB device 195 are enumerated by the sanitizer 150 and communication is handled by the sanitizer's host controller driver (HCD) 180 and the device-specific device driver 135. To prevent the sanitizer 150 itself from being attacked by the device 195, both the HCD 180 and the device driver 135 run in an isolated environment, illustrated by the isolation 210 and the corresponding dashed line. There are various techniques known to those skilled in the art to provide the isolation 210. For instance, this isolated environment can be established by using hardware- or software-based fault isolation techniques or virtualization techniques. The drivers could be placed into a separate environment by virtualization, for instance. In other examples, the HCD 180 and device driver 135 can be additionally instrumented and hardened to detect abnormal behavior, such as memory corruption. For instance, a compiler can instrument code for the drivers 180 and/or 135 to add additional checks into the code, e.g., where such checks can reduce or prevent memory corruption. Such instrumenting techniques can also be used for fault isolation.

The device driver 135 provides the functionality of the device 195 at the application layer 140. The sanitizer 150 will use the application layer functionality in application layer link 160 to link the device-side (e.g., bus 197) and the host-side (e.g., but 199) of the sanitizer 150. The application layer link 160 may be specific to the type of the USB device 195, such as the application layer link 160 for a USB storage device being different from the application layer link 160 for a keyboard (and also the application layer 140 would also be different based on the type of the USB device 195).

Analysis of the functional behavior of the device 195 can also be performed at this stage. The implementation by the sanitizer 150 of the device firmware 165 will process the application layer data and mimic the functionality of the USB device 195 to the host 105. The sanitizer 150 chooses the device firmware 165 corresponding to the device 195 that has been attached to the sanitizer 150. This effectively replaces the firmware 196 of the USB device 195 with the device firmware 165 of the sanitizer 150.

Figure 3:
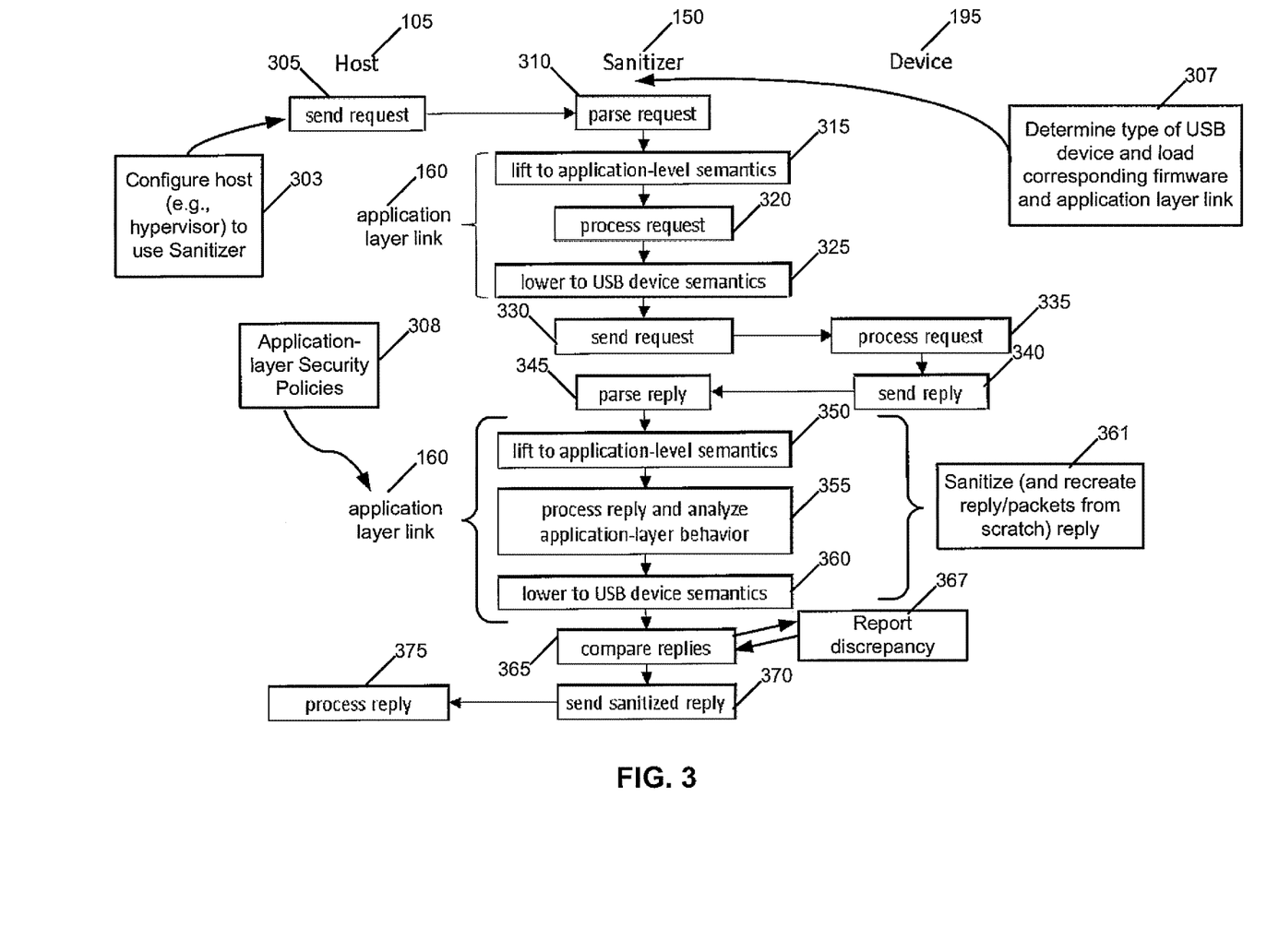
FIG. 3 is a logic flow diagram for a sanitization method for USE device firmware sanitization, and illustrates the operation of an exemplary method, a result of execution of computer program instructions embodied on a computer readable memory, functions performed by logic implemented in hardware, and/or interconnected means for performing functions in accordance with exemplary embodiments.

FIG. 3 describes one example of a sanitization method for USB device firmware sanitization based on steps involved with a host requesting functionality from a device. FIG. 3 further illustrates the operation of an exemplary method, a result of execution of computer program instructions embodied on a computer readable memory, functions performed by logic implemented in hardware, and/or interconnected means for performing functions in accordance with exemplary embodiments.

The sanitizer 150, as described above, uses three components to be available per function/device:

1) A device driver 135 that can handle device-side communication.

2) A corresponding device firmware 165 that can handle host-side communication.

3) An application layer link 160 that can pass data from the device-side driver data stack 270 to the host-side driver data stack 280.

One example for such an application layer link 160 is to use a file system representation of a mass storage device (e.g., for a USB device 195 advertising itself as having storage capabilities). The device driver 135 provides file-system level access to the data 107 stored on the USB device 195. The device firmware 165 accesses this data 107 through the file system and provides the data 107 to the host 105. Another example is keyboard scan-codes for HID-devices: the application layer link 160 takes the scan-codes provided by the device driver 135 and forwards them to the device firmware 165. Similarly, USB Ethernet network adapters may be linked at the level of Ethernet frames. It is noted that for USB Ethernet networking adapters, the application layer link is on the application layer already defined by the OSI model (which is higher than Ethernet frames). Further devices include audio interfaces (linking audio streams), webcams (forwarding image data), printer, serial, and musical instrument digital interface (MIDI) devices (forwarding or link corresponding data streams for these).

One exemplary description of the operations in FIG. 3 is as follows. Operations performed by the host 105 are on the left, while operations performed by the sanitizer 150 are in the middle, and operations performed by the USB device 195 are on the right.

In the examples where the sanitizer 150 is implemented as part of a host, block 303 is performed, where the host 105 (e.g., the hypervisor 182) is configured to use the sanitizer 150. In the hypervisor example, for instance, the hypervisor 182 would be configured to create the VM 181-2 for the sanitizer 150 and the VM 181-1 for the host VM 101, the virtual. USB ports 275-2 and 275-3 and the virtual USB connection 199 and configure the host VM 101 to use the virtual USB host port 275-3. In block 305, the host 105 sends a request to the sanitizer 150, which impersonates the original device 195.

In block 310, the sanitizer parses the request. It is noted that sometime prior to block 310, the sanitizer would perform other operations in order to be able to communicate with the USB device 195. For instance, in block 307, the sanitizer 150 determines a type (e.g., such as storage device, HID such as pointer, keyboard, camera) of USB device and loads corresponding firmware 165 and application layer link 160 for the USB device 195. This is possible, e.g., in Linux (a computer operating system) via the support Linux offers for a number of USB devices through the gadget framework or through its gadget driver framework. Other operating systems have similar features and of course it is possible for one skilled in the art to create such features.

Blocks 315, 320, and 325 may be performed by the application layer link 160. In block 315, the sanitizer 150 lifts the request from the USB-level semantics to application-level semantics using the sanitizer's device firmware 165. The sanitizer 150, in block 320, processes the request at the application level (for example, the file system level), e.g., to determine corresponding USB-level semantics. The sanitizer subsequently lowers the request to the determined USB-level semantics using its device driver 135 in block 325.

In block 330, the sanitizer sends the request to the USB device 195. The USB device in block 195 processes the request (block 335) and sends a reply in block 340.

In block 345, the sanitizer 150 parses the reply from the device 195 and lifts (block 350) the reply to application-level semantics using its device driver 135. Since the device driver 135 runs in an isolated environment, potential faults are contained and can be reported. Blocks 350, 355, and 360 are performed by the application layer link 160 in exemplary embodiments.

In block 355, the sanitizer 150 processes the reply at the application level and optionally analyzes the behavior observed at the application level. Potential misbehavior is contained and reported. The sanitizer in block 360 lowers the reply to USB-level semantics using its device firmware 165. The sanitizer 150 in block 365 compares the reply from the conversion against the reply originally sent by the device and reports (e.g., via outputting) potential inconsistencies. For instance, the USB packet(s) from the sanitizer 150 to the USB device 195 could have a length field with a certain value (e.g., such that the USB device 195 should return data of that length), but the USB packet(s) from the USB device 195 to the sanitizer 150 could have a different value in the length field. This discrepancy could be reported (e.g., via an output to a user via a display 175 or via other outputs such as to memory(ies) 145 or to a remote server via a NW I/F 130, as examples) in block 367.

In block 370, the sanitizer 150 sends the sanitized reply back to the host 105. It is noted that the process of blocks 350, 355, and 360 sanitizes the reply (e.g., by recreating the reply and its corresponding packets from scratch). This is illustrated by block 361. Thus, the sanitizing for block 361 is performed so that no communication from the USB device is directly forwarded to the host and instead only sanitized communications are forwarded to the host. The host, in block 375, processes the reply.

The application layer link 160 may implement security policies and particularly application-layer security policies 308. That is, the application layer link 160 can perform (see, e.g., block 355) analyses based on policies in the application-layer security policies 308. In addition to comparing USB replies, the application layer link 160 may also address application-layer behavior. For example, a policy in the application-layer security policies 308 may state that consecutive read requests for the same information for a file on the USB device 195 should yield the same content (unless a write is performed between the two consecutive requests for the same information). Another policy might state that if the application layer link 160 expects data with properties of X but instead receives data with properties of Y from the USB device, then this should be reported. Other examples are possible. One possible outcome is that if the application-layer behavior is not correct according to the policies 308, then the sanitizer 150 would output one or more indications that the policies 308 have been violated, and, e.g., an indication of which policy or policies have been violated. Other outcomes are possible, e.g., including having no indications that policies have been violated (such as might be used in a forensic analysis of a USB storage device).

The implementation of the sanitizer 150 could be based on (but is not limited to) Linux (a computer operating system). On the device side, Linux offers support for a number of USB devices through a gadget framework; and on the host side, Linux can emulate devices through its gadget driver framework.

Regarding the operations in FIG. 3, USB-level semantics means semantics on the USB-protocol layer, i.e., poll device, receive packets from device, and the Application-level semantics are higher up in the protocol stack, for example in the case of a storage device, these would be read/write file access semantics. The lifting from USB-level semantics to application-level semantics is performed because a malicious device might try to exploit the protocol stack on the host, but this is an attack contained in the sanitizer's device driver 135, which may be isolated and thus feature additional hardening mechanisms against exploitation, as described above for an exemplary embodiment.

Consider the following storage device example (e.g., where the USB device 195 is a USB flash storage drive), where the following steps indicate how the sanitizer would prevent potential exploitation.

Step 0) A USB flash storage drive is attached to the sanitizer. The sanitizer 150 from now on mimics a storage device.

Step 1) The host 105 wants to perform a read access on a file and uses a read request to do so (block 310). The application-level read request is lowered to USB-level semantics by the host's own device driver (e.g., as part of the driver stack 171) and the corresponding USB packets are sent to the sanitizer 150.

Step 2) The sanitizer 150 picks up the USB packets and translates (block 315) them to application-level semantics, using its own device firmware 165 for storage devices. The sanitizer 150 now sees a read request for a specific file (block 320).

Step 3) The sanitizer 150 uses its own device driver 135 for storage devices to translate the file read request to USB packets, which the sanitizer 150 sends to the storage device 195.

Step 4) The malicious storage device 195 processes the USB packets received from the sanitizer. Instead of processing them faithfully, the malicious storage device 195 sends back packets which will cause a memory corruption in a device driver.

Step 5) The sanitizer 150 receives the packets, which are processed by its own device driver 135. Since the device driver 135 is running, e.g., with special hardening techniques, the memory corruption is detected and the exploitation attempt is thwarted.

Note that the malicious data sent by the storage device 195 never reaches the host 105, since the storage device 195 is only communicating with the sanitizer 150. Another way of putting this is that this exemplary embodiment removes the host's device driver code from the attack surface exposed to a malicious device.

In an exemplary embodiment, the sanitizer itself works via the computer readable code 185 and execution of the same by the one or more processors 110 (e.g., as in FIG. 1B). In the case of a deployment as a separate hardware device (as in FIG. 1C), the sanitizer 150 talks to hardware USB controllers using HCD/UDC for the host/device USB ports 275.

The host 105 only communicates with the clean device firmware 165 of the sanitizer and never to the device firmware 196 of the "actual" device 195. Additionally, the potentially malicious device 195 never directly talks to the HCD 186 of the host 105, only to the HCD 180 of the sanitizer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, dr portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following abbreviations that may be found in the specification and/or the drawing figures are defined as follows:
HCD host controller driver
HID human interface device
I/O input/output
I/F interface
MIDI musical instrument digital interface
NW network
OS operating system
OSI open systems interconnection
UDC USB device controller
USB universal serial bus
VM virtual machine

What is claimed is:

1. A method, comprising:
   intercepting communications between a universal serial bus (USB) device and a host, at least by implementing first device firmware of the USB device, wherein the second device firmware is implemented in the USB device; and
   sanitizing, using at least the implemented first device firmware, intercepted communications from the USB device toward the host, the sanitizing performed so that no communication from the USB device is directly forwarded to the host and instead only sanitized communications are forwarded to the host, wherein:
   sanitizing is performed by a sanitizer having a host side and a device side and further comprises:
      converting requests from the host to the USB device from USB-level semantics used by the device side to application-level semantics used by the host side, processing the request at an application level to determine first USB-level semantics to use to communicate the request to the USB device, and lowering the application-level semantics to the determined first USB-level semantics for sending to the USB device; and
      converting replies from the USB device to the host from the USB-level semantics to the application-level semantics, processing the replies at the application level to determine second USB-level semantics to use to communicate the replies to the host, and lowering the application-level semantics to the determined second USB-level semantics for sending to the host; and
      performing the sanitizing based at least on analysis of one or both of the application-level semantics and the USB-level semantics.

2. The method of claim 1, wherein the implementing is performed to cause the host to communicate with the first device firmware and not with the second device firmware of the USB device.

3. The method of claim 1, further comprising determining the first device firmware based on and corresponding to a type of the USB device and wherein the implementing implements the determined first device firmware.

4. The method of claim 3, wherein:
   the first device firmware is implemented as part of the host side of the sanitizer;
   the sanitizer performs the determining the first device firmware based on and corresponding to the USB device and performs the implementing;

the intercepting further comprises intercepting communications from the host toward the USB device using the host side of the sanitizer; and the intercepting further comprises intercepting communications from the USB device using a device side of the sanitizer, the device side comprising a host control driver intercepting the communications from the USB device and a device driver selected by the sanitizer to correspond to the USB device.

5. The method of claim 4, wherein:
the host side further comprises a USB device controller intercepting communications from the host toward the USB device and passing the communications to the first device firmware.

6. The method of claim 1, further comprising, for a reply received from the USB device, performing a comparison of a reply, from the converting, with the reply received from the USB device and performing the sanitizing based on the comparison.

7. The method of claim 6, further comprising outputting a report of at least one discrepancy for the comparison.

8. The method of claim 4, wherein the host control driver and the device driver are isolated from other elements in the sanitizer.

9. The method of claim 4, wherein intercepting further comprises performing by the sanitizer application-level analyses based on policies in one or more application-layer security policies to determine whether the communications between the USB device and the host violate any of the one or more application-layer security policies, and outputting a report of any violation of the one or more application-layer security policies.

10. An apparatus, comprising:
one or more memories comprising computer readable code stored thereon;
one or more processors, the one or more processors configured, in response to execution of at least a portion of the computer readable code, to cause the apparatus to perform operations comprising:
intercepting communications between a universal serial bus (USB) device and a host, at least by implementing first device firmware of the USB device, wherein the second device firmware is implemented in the USB device; and
sanitizing, using at least the implemented first device firmware, intercepted communications from the USB device toward the host, the sanitizing performed so that no communication from the USB device is directly forwarded to the host and instead only sanitized communications are forwarded to the host, wherein:
sanitizing is performed by a sanitizer having a host side and a device side and further comprises:
converting requests from the host to the USB device from USB-level semantics used by the device side to application-level semantics used by the host side, processing the request at an application level to determine first USB-level semantics to use to communicate the request to the USB device, and lowering the application-level semantics to the determined first USB-level semantics for sending to the USB device; and
converting replies from the USB device to the host from the USB-level semantics to the application-level semantics, processing the replies at the application level to determine second USB-level semantics to use to communicate the replies to the host, and lowering the application-level semantics to the determined second USB-level semantics for sending to the host; and
performing the sanitizing based at least on analysis of one or both of the application-level semantics and the USB-level semantics.

11. The apparatus of claim 10, wherein the intercepting and sanitizing are performed as part of the host.

12. The apparatus of claim 10, wherein the intercepting and sanitizing are performed in a device separate from the host.

13. The apparatus of claim 10, wherein the implementing is performed to cause the host to communicate with the first device firmware and not with the second device firmware of the USB device.

14. The apparatus of claim 10, wherein the one or more processors are further configured, in response to execution of at least a portion of the computer readable code, to cause the apparatus to perform operations comprising: determining the first device firmware based on and corresponding to a type of the USB device and wherein the implementing implements the determined first device firmware.

15. The apparatus of claim 14, wherein:
the first device firmware is implemented as part of the host side of the sanitizer;
the sanitizer performs the determining the first device firmware based on and corresponding to the USB device and performs the implementing;
the intercepting further comprises intercepting communications from the host toward the USB device using the host side of the sanitizer; and
the intercepting further comprises intercepting communications from the USB device using a device side of the sanitizer, the device side comprising a host control driver intercepting the communications from the USB device and a device driver selected by the sanitizer to correspond to the USB device.

16. A computer program product comprising a non-transitory computer readable storage medium having program instructions embodied therewith, the program instructions readable and executable by a computing system to cause the computing system to perform operations comprising:
intercepting communications between a universal serial bus (USB) device and a host, at least by implementing first device firmware of the USB device, wherein the second device firmware is implemented in the USB device; and
sanitizing, using at least the implemented first device firmware, intercepted communications from the USB device toward the host, the sanitizing performed so that no communication from the USB device is directly forwarded to the host and instead only sanitized communications are forwarded to the host, wherein:
sanitizing is performed by a sanitizer having a host side and a device side and further comprises:
converting requests from the host to the USB device from USB-level semantics used by the device side to application-level semantics used by the host side, processing the request at an application level to determine first USB-level semantics to use to communicate the request to the USB device, and lowering the application-level semantics to the determined first USB-level semantics for sending to the USB device; and
converting replies from the USB device to the host from the USB-level semantics to the application-level semantics, processing the replies at the application level to determine second USB-level semantics to use to communicate the replies to the host, and lowering the application-level semantics to the determined second USB-level semantics for sending to the host; and performing the sanitizing based at least on analysis of one or both of the application-level semantics and the USB-level semantics.

\* \* \* \* \*